United States Patent
Sanchez et al.

(10) Patent No.: US 10,207,635 B1
(45) Date of Patent: Feb. 19, 2019

(54) SYSTEM AND METHOD FOR AUTOMATICALLY MODIFYING BRAKE LIGHT INTENSITY

(71) Applicant: STATE FARM MUTUAL AUTOMOBILE INSURANCE COMPANY, Bloomington, IL (US)

(72) Inventors: Kenneth J. Sanchez, San Francisco, CA (US); Aaron Scott Chan, Bloomington, IL (US)

(73) Assignee: STATE FARM MUTUAL AUTOMOBILE INSURANCE COMPANY, Bloomington, IL (US)

(*) Notice: Subject to any disclaimer, the term of this patent is extended or adjusted under 35 U.S.C. 154(b) by 0 days.

(21) Appl. No.: 15/872,668

(22) Filed: Jan. 16, 2018

Related U.S. Application Data

(60) Provisional application No. 62/447,785, filed on Jan. 18, 2017.

(51) Int. Cl.
*B60Q 1/44* (2006.01)
*B60Q 1/46* (2006.01)
*B60Q 1/50* (2006.01)
*B60Q 9/00* (2006.01)

(52) U.S. Cl.
CPC ............ *B60Q 1/44* (2013.01); *B60Q 1/46* (2013.01); *B60Q 1/50* (2013.01); *B60Q 9/00* (2013.01); *B60Q 2900/30* (2013.01)

(58) Field of Classification Search
CPC ............ B60Q 1/44; G08G 1/096741; G08G 1/096791; H04L 67/12; H04L 2012/40273
See application file for complete search history.

(56) References Cited

U.S. PATENT DOCUMENTS

| | | | |
|---|---|---|---|
| 2003/0201884 A1* | 10/2003 | Perez ................. | B60Q 1/444 340/467 |
| 2009/0072996 A1* | 3/2009 | Schoepp ............. | B60Q 1/1423 340/903 |
| 2017/0024938 A1* | 1/2017 | Lindsay ............. | G07C 5/02 |

* cited by examiner

*Primary Examiner* — Thomas S McCormack
(74) *Attorney, Agent, or Firm* — Marshall, Gerstein & Borun LLP; Randall G. Rueth

(57) ABSTRACT

Systems and methods for detecting distracted drivers and reducing risks posed by the distracted drivers are disclosed. According to certain aspects, an electronic device may capture and analyze image data that depicts an operator of a vehicle in various levels of distraction. The electronic device may determine, based on the analysis, whether the operator is distracted, and determine an additional vehicle that may be located in front of the vehicle. The electronic device may generate and transmit a command to an additional electronic device that, upon execution, causes brake lights of the additional vehicle to modify in intensity.

20 Claims, 5 Drawing Sheets

SYSTEM AND METHOD FOR AUTOMATICALLY MODIFYING BRAKE LIGHT INTENSITY

CROSS-REFERENCE TO RELATED APPLICATIONS

This application claims benefit of the filing date of U.S. Provisional Patent Application No. 62/447,785, filed Jan. 18, 2017 and titled "SYSTEM AND METHOD FOR AUTOMATICALLY MODIFYING BRAKE LIGHT INTENSITY," the disclosure of which is hereby incorporated by reference in its entirety.

FIELD

The present disclosure is directed to detecting the level of distraction of vehicle operators. More particularly, the present disclosure is directed to systems and methods for increasing the brake light luminosity of vehicles who are directly in front of or who are in the vicinity of distracted drivers.

BACKGROUND

Vehicles serve as a common form of transportation utilized by many. Often, vehicle usage can lead to road congestion. Vehicle operators are required to stay focused on the vehicles ahead of them as well as road conditions. In some circumstances, a distracted individual may cause an accident that could result in vehicle damage, traffic jams, and/or injury or death.

As hand-held devices have evolved, more individuals have become accustomed to always being virtually connected. Additionally, vehicles have experienced an increased prevalence of sensors capable of sensing and generating data associated with vehicle operators and their operation. However, even with this increasing prevalence, there are no existing solutions for determining when specific drivers are operating vehicles in certain situations. For example, there is no existing solution for determining when a vehicle operator may be distracted. Accordingly, there is an opportunity for systems and methods to leverage various data to determine when vehicle operators may be distracted, and accordingly facilitate certain actions to mitigate the risks posed by the distracted vehicle operators.

SUMMARY

In one aspect, a computer-implemented method of dynamically modifying brake lights of a first vehicle is provided. The method may include receiving, from a first electronic device associated with the first vehicle, image data depicting an operator of the first vehicle, analyzing, by a processor, the image data to determine a set of characteristics associated with the operator depicted in the image data, accessing a set of baseline image data having a set of baseline characteristics, comparing the set of characteristics of the image data to the set of baseline characteristics of the set of baseline image data, based on the comparing, determining that the operator of the first vehicle is distracted, determining, based on a location of the first vehicle, a second vehicle that is located in front of the first vehicle, and transmitting, via a communication network, a brake light command to a second electronic device associated with the second vehicle, wherein the second electronic device is configured to execute the brake light command to cause brake lights of the second vehicle to modify intensity.

In another aspect, a server configured to dynamically modify brake lights of a first vehicle is provided. The server comprises a transceiver configured to communicate data via at least one network connection, a memory configured to store non-transitory computer executable instructions and a set of baseline image data having a set of baseline characteristics, and a processor configured to interface with the transceiver and the memory, wherein the processor is configured to execute the non-transitory computer executable instructions to cause the processor to: receive, from a first electronic device associated with the first vehicle via the transceiver, image data depicting an operator of the first vehicle, analyze the image data to determine a set of characteristics associated with the operator depicted in the image data, access, from the memory, the set of baseline image data having the set of baseline characteristics, compare the set of characteristics of the image data to the set of baseline characteristics of the set of baseline image data, based on the comparing, determine that the operator of the first vehicle is distracted, determine, based on a location of the first vehicle, a second vehicle that is located in front of the first vehicle, and transmit, via the transceiver, a brake light command to a second electronic device associated with the second vehicle, wherein the second electronic device is configured to execute the brake light command to cause brake lights of the second vehicle to modify intensity.

DETAILED DESCRIPTION

Figure 1:
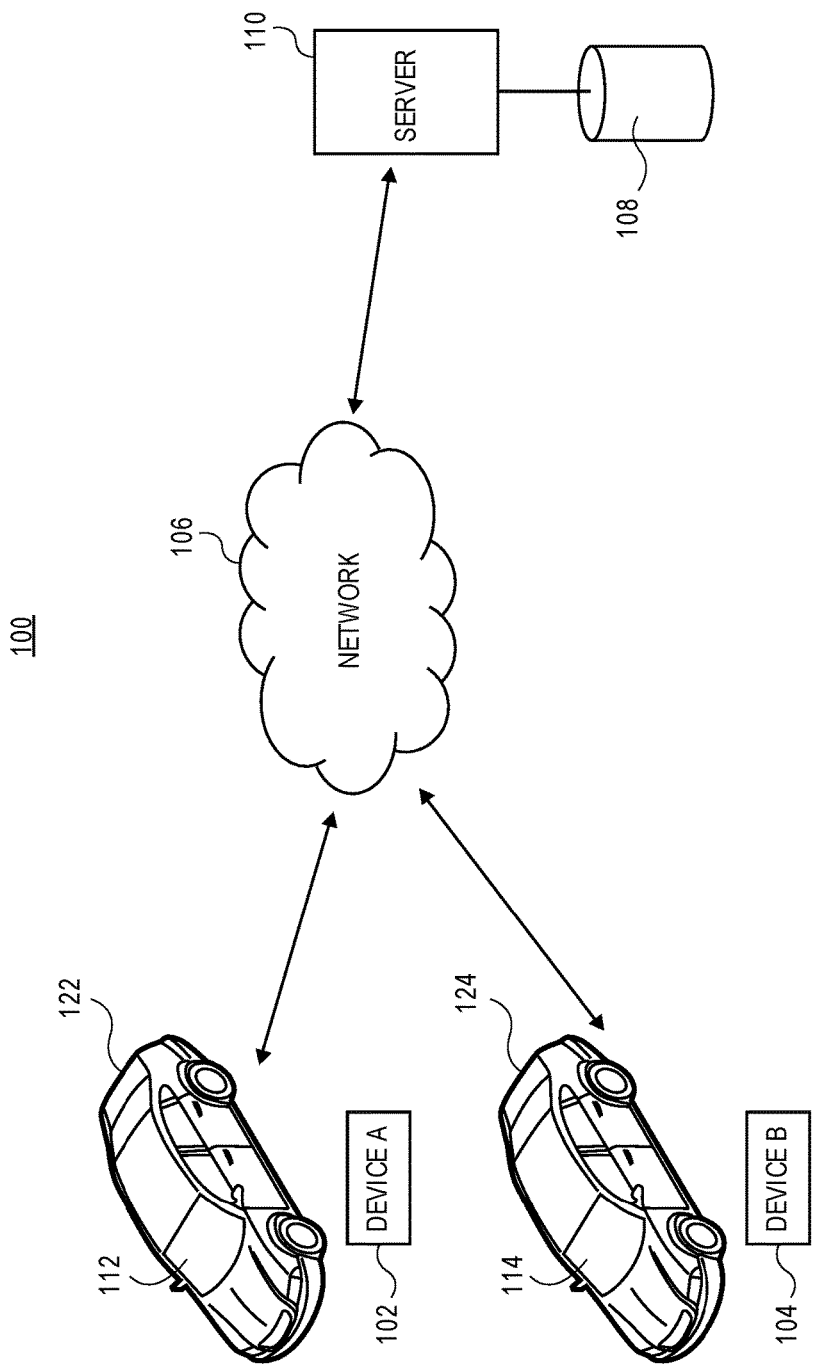
FIG. 1 illustrates an example depiction of a system 100 that may include various components associated with the systems and methods.

The present embodiments may relate to, inter alia, detecting distracted vehicle operators and performing actions to mitigate risks posed by the distracted vehicle operators. There has been much focus on distracted drivers, as evidenced by certain laws being enacted to deter drivers from engaging in distracted behavior, such as texting and driving and talking on the phone. However, there is no way to determine which drivers are distracted other than an individual having a direct view into the driver's side of the vehicle.

According to certain aspects, a vehicle or an electronic device within the vehicle may be equipped with one or more image sensors. The image sensor(s) may be configured to capture image data of an operator (or a passenger(s)) of the vehicle and transmit the captured image data to an electronic device. After receiving the image data, the electronic device may access stored user profile data that may include physical characteristics of a set of users. The electronic device may analyze the received image data by comparing the received image data to the stored user baseline image data. The electronic device may determine a close match between the captured image data and an image from the baseline data and, based on a classification of the applicable baseline image data, the electronic device may determine that the operator of the vehicle is distracted.

The electronic device may then determine a location of the vehicle as well as determine that another vehicle is located directly in front of the vehicle with the distracted driver. The electronic device may generate and send a command to the leading vehicle which may cause the brake lights of the leading vehicle to increase in luminosity, thus potentially attracting the attention of the distracted operator.

The systems and methods therefore offer numerous benefits. In particular, a vehicle operator who is distracted may more readily recognize risks posed by his or her vehicle operation, and may take action to avoid causing an accident. Additionally, additional vehicle operators may become more aware of a distracted driver in their vicinity, which may also result in a reduced amount of accidents. It should be appreciated that other benefits are envisioned.

The systems and methods discussed herein address a challenge that is particular to reducing risks posed by distracted drivers. In particular, the challenge relates to a difficulty in identifying a distracted driver and then gaining the attention of the distracted driver. In conventional environments, there is no mechanism to leverage other vehicles to cause a distracted driver to become less distracted. In contrast, the systems and methods automatically detect a distracted driver and generate a command to be sent from an electronic device in the distracted driver's vehicle to an electronic device located in a vehicle within view of the distracted driver. Further, because the systems and methods employ the collection, analysis, and transmission of data between and among multiple electronic devices, the systems and methods are necessarily rooted in computer technology in order to overcome the noted shortcomings.

Similarly, the systems and methods provide improvements in a technical field, namely, driver and vehicle data compiling. Instead of the systems and methods merely being performed by hardware components using basic functions, the systems and methods employ complex steps that go beyond the mere concept of simply retrieving and combining data using a computer. In particular, the hardware components capture image data, analyze the image data in combination with stored baseline image data, access vehicle operation data, and analyze the image data and the vehicle operation data to determine the level of distraction of the driver and correlate the location of the distracted driver's vehicle with the location of vehicles that may be located within view of the distracted driver.

According to implementations, the systems and methods may support a dynamic, real-time or near-real-time analysis of any captured, received, and/or detected data. In particular, the electronic device may receive or capture image data in real-time or near real-time, may automatically and dynamically analyze the captured image data by comparing the captured image data to stored baseline image data, and may generate and transmit commands between electronic devices in real-time or near real-time.

FIG. 1 illustrates an example depiction of a system 100 that may include various components associated with the systems and methods. In some scenarios, operator A 112 may operate (i.e., drive) a vehicle A 122 and operator B 114 may operate (i.e., drive) a vehicle B 124. In certain situations, vehicle A 122 may be located directly in front of vehicle B 124, or positioned in other locations relative to vehicle B 124. It should be appreciated that in another embodiment, vehicle B 124 may be directly in front of vehicle A 122. Operator A 112 may we located within vehicle A 122 and operator B 114 may be located within vehicle B 124. Device A 102 may be located in or on, or otherwise associated with, an interior or exterior of vehicle A 122 and device B 104 may be located in or on, or otherwise associated with, an interior or exterior of vehicle B 124.

Each of device A 102 or device B 104 may be any type of electronic device. For example, each of device A 102 or device B 104 may be a smartphone, notebook computer, tablet, phablet, GPS (Global Positioning System) or GPS-enabled device, smart watch, smart glasses, smart bracelet, wearable electronics, PDA (personal digital assistant), pages, computing device configured for wireless communication, and/or the like. The devices 102 and 104 may be configured with at least one image sensor configured to capture digital image data, as discussed herein. The devices 102 and 104 may further include additional sensors, such as a clock, accelerometer, location module (e.g., GPS chip), gyroscope, compass, biometric, and/or other types of sensors.

Each of device A 102 and device B 104 may be configured to communicate with a server 110 via one or more networks 106. In embodiments, the network(s) 106 may support any type of data communication via any standard or technology (e.g., GSM, CDMA, TDMA, WCDMA, LTE, EDGE, OFDM, GPRS, EV-DO, UWB, Internet, IEEE 802 including Ethernet, WiMAX, Wi-Fi, Bluetooth, and others). The server 110 may be configured to interface with or support a memory or storage 108 capable of storing various data. In embodiments, the storage 108 may store information related to operator A 112 and operator B 114, and in particular, may store information related to the respective levels of distraction of the operators 112 and 114.

According to embodiments, each of device A 102 and device B 104 may be configured to capture and analyze image data that may depict the respective operators 112, 114 and may indicate the level of distraction of the respective operators 112, 114. In particular, an image sensor or similar component of the device A 102 (or the device B 104) may capture the image data that depicts operator A 112 (or operator B 114). Additionally, a processor of the device A 102 (or the device B 104) may analyze the image data captured by the respective image sensor. According to embodiments, the server 110 or device B 104 may capture an image of operator B 114. The server 110 or device B 104 may compare the captured image of operator B 114 to a set of baseline image data to determine a set of characteristics associated with an operator depicted in the captured image data (i.e., operator B). The set of baseline image data consists of multiple images depicting various states of a baseline or generic operator. Each state is classified with a level of distraction (e.g., on a scale of 1-10). For example, a baseline image of a vehicle operator with a straight back, and head and eyes facing forward may be classified as "1" on a scale of 1-10 (i.e., not distracted). In another example, a baseline image of a vehicle operator having his shoulders hunched over, head bent down, and eyes looking down and to the right may be classified as a "9" on a scale of 1-10 (i.e., severely distracted).

After comparing the image data of operator B 114 with the set of baseline images, the server 110 or device B 104 may select an image from the baseline image data that is most similar to the captured image of operator B. The server 110 or device B 104 may calculate a similarity percentage between the captured image and the image from the baseline image data. The similarity percentage represents how close the characteristics of the captured image match those of the image from the baseline image data. The server 110 or device B 104 may analyze the set of characteristics, the similarity percentage, and level of the distraction of the baseline image to determine a level of distraction for operator B 114 as depicted in the image data. Based on the level of distraction, the server 110 or device B 104 may determine that the level of distraction of operator B 114 exceeds a threshold and may deem operator B 114 as being distracted. In the case where the server 110 or device B 104 deems operator B 114 distracted, the server 110 or device B 104 may determine the location of vehicle B 124. Using the location of vehicle B 124, the server 110 or device B 104 may determine or identify a set of vehicles that may be located in front of (directly or indirectly) vehicle B 124. In one embodiment, the server 110 may determine that vehicle A 122 is located directly in front of vehicle B 124. Accordingly, the server 110 may generate and transmit a command to device A 102, and device A may execute the command to cause the intensity or luminosity of the rear brake lights of vehicle A 112 to increase. As a result, operator B 114 may more readily notice the increased intensity or luminosity of the brake lights of vehicle A, and may become less distracted, among other benefits.

It should be appreciated that device A 102 and device B 104 may perform and facilitate various of the image processing and additional image analysis functionalities, in addition or as an alternative to the server 110 performing and facilitating the functionalities. In particular, the device may perform any or all of analyzing the captured image data, analyzing and determining the set(s) of characteristics associated with being distracted therewith, and sending the command to modify brake lights.

Figure 2:
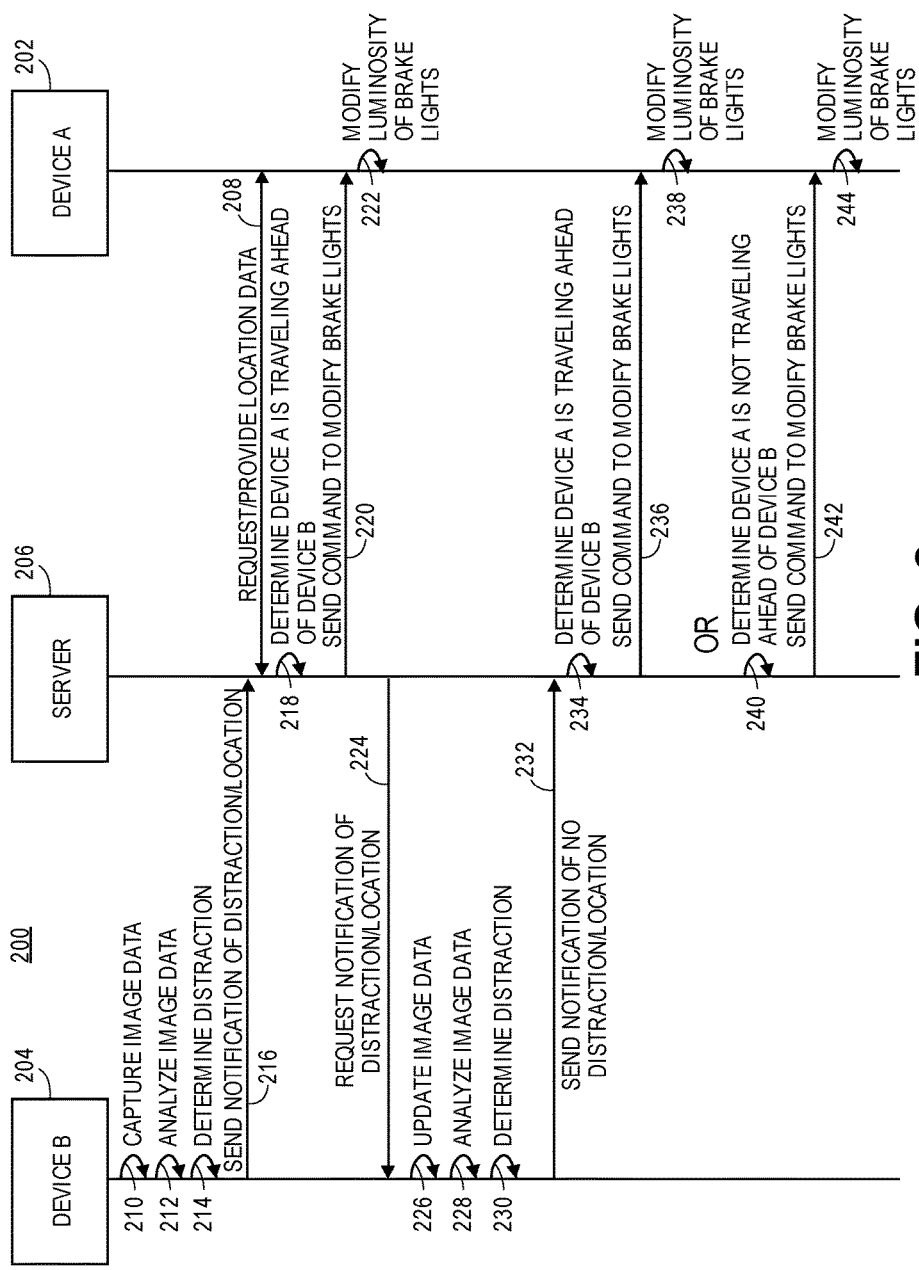
FIG. 2 depicts an exemplary signal diagram associated with analyzing image data to identify vehicle operators' level of distraction, in accordance with some embodiments.

FIG. 2 depicts a signal diagram 200 associated with certain functionalities related to the systems and methods. The signal diagram 200 includes various components including: device B 204 (such as device B 104 as discussed with respect to FIG. 1), a server 206 (such as the server 110 as discussed with respect to FIG. 1), and device A 202 (such as device A 102 as discussed with respect to FIG. 1).

It should be appreciated that the devices 202 and 204 may support and execute an application configured to facilitate the communications and functionalities as described herein. According to embodiments, device A 202 may be associated with vehicle A that may be operated by operator A, and device B 204 may be associated with vehicle B that may be operated by operator B.

The signal diagram 200 may begin when the device B 204 captures (210) image data that may depict operator B. The image data may generally be digital image data and may be in the form of one or more digital images and/or video data that may be captured by an image sensor of device B 204. After capturing (210) the image data, device B 204 may analyze (212) the image data and determine a set of characteristics, actions or activities associated with operator B, who may be depicted in the image data. For example, the device B 204 may capture an image that depicts operator B's head facing a passenger seated in the front seat, followed by another image that depicts operator B's head facing forward towards the vehicle in front of him. Another image may depict operator B's head facing the back seat where a passenger may be seated. Device B 204 may compare the set of characteristics depicted in the captured image data to a set of baseline image data. For example, device B 204 may analyze the position of operator B's head or the direction in which operator B's eyes are pointed, relative to image content included in the set of baseline image data.

It should be appreciated that device B 204 may employ various image processing techniques, algorithms, calculations, or the like in analyzing the image data. For example, device B 204 may employ pixilation, linear filtering, image editing, image restoration, principal components analysis, independent component analysis, hidden Markov models, anisotropic diffusion, partial differential equations, self-organizing maps, neural networks, wavelets, and/or others.

In analyzing the captured image data of operator B, device B 204 may compare or match the captured image data to an image from the set of baseline image data that most closely represents the captured image of operator B. Each image of the baseline image data may be classified to represent various states of distraction of a depicted operator. After selecting an image from the baseline image data, device B 204 may calculate or assign a similarity percentage to the captured image. The similarity percentage (e.g., 0-100%) may represent how close the characteristics of the captured image match those of the image from the baseline image data. Based on the similarity percentage, device B 204 may determine that the similarity percentage is above a particular threshold and consider the captured image a close match to the image from the baseline image data.

Device B 204 may analyze the classification and the similarity percentage of the captured image to determine (214) the level of distraction. For example, the captured image is considered to be a close match to the image from the baseline image data that has a classification of "9" on a scale of 1-10 (i.e., severely distracted). Device B 204 may then compare the captured image to the image from the baseline image data that has a classification of "9". Device B 204 may determine that the set of characteristics between the image and the baseline image is approximately a 90% match. Device B 204 may then assign a 90% similarity percentage to the captured image. Device B 204 may then determine that the assigned similarity percentage is above a particular threshold and may consider the captured image a close match to the image from the baseline image data that has a classification of "9". Based on determining that the assigned similarity percentage is above the particular threshold, device B 204 may designate that operator B is distracted.

In another example, device B 204 may compare the captured image to the image form the baseline image data and determine that 50% of the characteristics of the images match. Accordingly, device B 204 may assign a 50% similarity percentage to the captured image, and device B 204 may determine that the similarity percentage is below a particular threshold and is therefore not considered a close match to the image from the baseline image data.

After device B 204 determines that operator B is distracted, device B 204 may determine the location of device B 204 (which may correspond to the location of vehicle B). Device B 204 may send (216), to the server 206, an indication or notification that operator B is distracted as well as the location of device B 204 and additional operating parameters (e.g., speed or direction of travel).

In some embodiments, the server 206 may perform the image analysis as discussed herein. In particular, device B 204 may transmit the image data to the server 206 via one of a variety of wireless network connections. In an implementation, device B 204 may automatically transmit the image data to the server 206 in response to capturing the image data. In another implementation, operator B may select to transmit the image data to the server 206. For example, after device B 204 captures a set of images, operator B 114 may select to transmit the set of images to the server 206.

After receiving the notification from device B 204, the server 206 may determine a location(s) of a vehicle(s) in proximity to vehicle B 124. In particular, the server 206 may request (208) device A 202 to provide its location as well as other operating parameters (e.g., speed or direction of travel). In an implementation, the location may be in the form of GPS coordinates.

The server 206 may compare the location of vehicle B with the determined location(s) of the vehicle(s). In particular, the server 206 may determine that vehicle A is directly ahead of vehicle B. In particular, the server(s) 206 may analyze GPS coordinates, the speed of the vehicles, and/or the direction of travel of the vehicles to determine that vehicle A is directly in front of vehicle B. In an implementation, the server(s) 206 may periodically request the location and operating parameters of additional vehicles, in an attempt to determine when a specific vehicle may be traveling in front of vehicle B.

In response to determining that vehicle A is in front of vehicle B, the server 206 may generate and send a command (220) to device A 202. In particular, the command may be executed by device A 202, and where the command may be configured to modify the luminosity of the brake lights of vehicle A. After receiving the command, device A 202 send the command to a brake light interface, such as a hardware module or software application, that may be connected, directly or indirectly, to the brake lights. The brake light interface may communicate directly to the brake lights or indirectly through the On-Board Device (OBD) system of vehicle A. In an implementation, the brake light interface may be a component of the OBD system. Execution of the command by the OBD system or the brake interface may cause the brake lights of vehicle A to increase or otherwise modify (222) in luminosity. With the increase in luminosity of the brake lights of vehicle A, operator B may be more likely to notice the bright lights of vehicle A and become less distracted and cease performing any distracting movements or actions. Accordingly, the modified brake lights of vehicle A may serve to alert operator B that he/she may be distracted.

In an implementation, the server 206 may determine (234) that vehicle A maintains its location and position ahead of vehicle B. Otherwise, the server 206 may detect that either operator B 204 is no longer distracted or that vehicle A is no longer directly ahead (240) of vehicle B. Accordingly, the server 206 may generate and send an additional command (242) to device A 202. Upon receiving the additional command from the server 206, device A 202 may cause the additional command to be executed to revert the luminosity of the brake lights of vehicle A to revert back to their normal state. In particular, device A 202 may send the additional command to the brake light interface, which may execute the additional command.

If the server 206 or device B 204 determines that operator B remains distracted, the luminosity of vehicle A's brake lights may remain at the increased level of luminosity. In one variation, device A 202 may receive additional commands from the server 206 to increase the luminosity of vehicle A's brake lights due to operator B remaining distracted. In particular, device A 202 may send a command to the brake light interface to further increase the luminosity of the brake lights and/or cause the brake lights to blink at variable rates in order to attract the attention of operator B.

If the server determines that vehicle A is no longer in front of vehicle B, the server 206 may determine or identify an additional vehicle that may be in front of vehicle B. After the server 206 identifies the additional vehicle that is directly ahead of operator B, the server may send an additional command to the additional vehicle to cause the brake lights of the additional vehicle to modify in luminosity.

Device A 202 may receive an indication or an alert from the server 206 or device B 204 that indicates that operator B may be distracted, and as a result, the luminosity of vehicle A's brake lights was modified. In response to receiving the indication from the server 206 or device B 204, device A 202 may display the alert or indication to a user of device A 202 (i.e., operator A), where the alert or indication may be a steady or flashing light. In an implementation, the indication or alert may identify vehicle B so that the user of device A 202 may be aware of which vehicle operator may be distracted.

It should be appreciated that any of device A 202, device B 204, or the server 206 may perform certain of the functionalities different from that depicted in FIG. 2. For example, even though FIG. 2 depicts the device B 204 as analyzing the image data and determining the level of distraction, it should be appreciated that the server 206 and/or device A 202 may additionally or alternatively perform these functionalities.

Figure 3A:
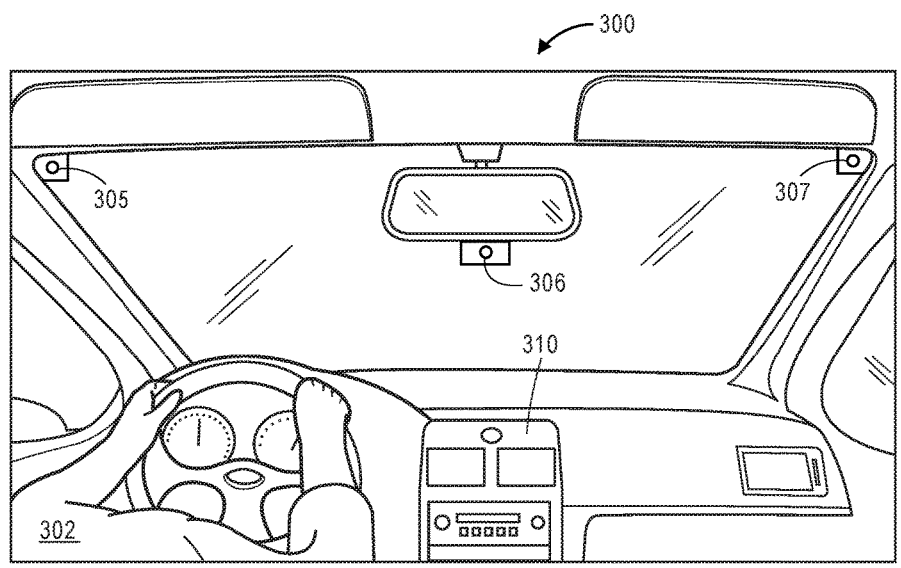
FIG. 3A depicts an example depiction of an interior of a vehicle and the vehicle's various components.

FIG. 3A illustrates an example depiction of an interior of a vehicle 300 that may include various components associated with the systems and methods. In some scenarios, an operator B 302 may operate (i.e., drive) the vehicle 300. As depicted in FIG. 3A, the interior of the vehicle 300 may support a set of image sensors 305, 306, 307. In the particular scenario depicted in FIG. 3A, each of the image sensors 305, 307 is located near a top corner of the interior of the vehicle 300, and the image sensor 306 is located below a rear view mirror. Although three (3) image sensors are depicted in FIG. 3A, it should be appreciated that additional or fewer image sensors are envisioned. Further, it should be appreciated that the image sensors 305, 306, 307 may be disposed or located at various alternate or additional portions of the vehicle 300, including on an exterior of the vehicle 300.

Each of the image sensors 305, 306, 307 may be configured to detect and convey information that constitutes an image. In particular, each of the image sensors 305, 306, 307 may generate digital image data according to the detected information, where the digital image data may be in the form of image data and/or video data.

The vehicle 300 may also be configured with an electronic device 310 configured with any combination of software and hardware components. In some implementations, the electronic device 310 may be included as part of an on-board diagnostic (OBD) system or any other type of system configured to be installed in the vehicle 300, such as an original equipment manufacturer (OEM) system, the electronic device 110 may include a set of sensors configured to detect and record various telematics data associated with the vehicle 300. In some implementations, the electronic device 310 may be configured to communicate with (i.e., request, retrieve, or receive data from) a set of sensors disposed in other locations of the vehicle 300, such as each of the image sensors 305, 306, 307. Further, in some implementations, the electronic device 310 itself may be equipped with one or more image sensors.

According to embodiments, the set of sensors included in the electronic device 310 or otherwise configured to communicate with the electronic device 310 may be of various types. For example, the set of sensors may include a location module (e.g., a global positioning system (GPS) chip), an accelerometer, an ignition sensor, a clock, speedometer, a torque sensor, a throttle position sensor, a compass, a yaw rate sensor, a tilt sensor, a steering angle sensor, a brake sensor, and/or other sensors. The set of sensors may also be configured to detect various conditions of the individual 302, including various biometric information, movements, and/or the like.

Figure 3B:
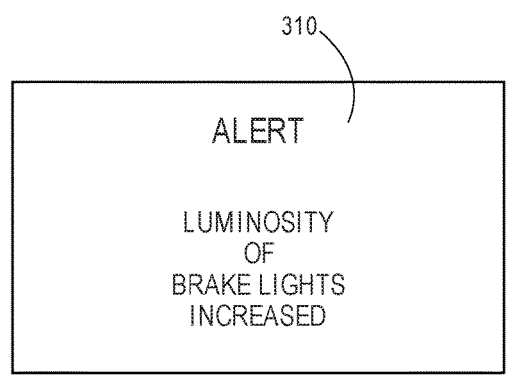
FIG. 3B depicts an alert interface associated with an operator distraction alert message.

FIG. 3B illustrates an alert interface 310 indicating that the luminosity of a vehicle's brake lights are increased. An electronic device (e.g., a mobile device, such as a smartphone) may be configured to display the interface 310 and/or receive selections and inputs via the interface 310, where the electronic device may be associated with an operator of a vehicle, or may be integrated into the vehicle. For example, a dedicated application that is configured to operate on the electronic device may display the interface 310. It should be appreciated that the interface 310 is merely exemplary and that alternative or additional content is envisioned.

In some embodiments the interface 310 may be located on or near the dashboard of the corresponding vehicle. It should be appreciated that the interface 310 may include alternate or additional information. For example, the alert interface 310 may indicate a make and model of an additional vehicle being operated by a distracted operator (e.g., an additional vehicle traveling behind the vehicle). The interface 310 may also include an "OKAY" selection that enables the operator to select to dismiss the interface 310. Further, the interface 310 may include a "MORE INFO" selection that enables the operator to view more information, such as more detailed information associated with any additional vehicle.

Figure 4:
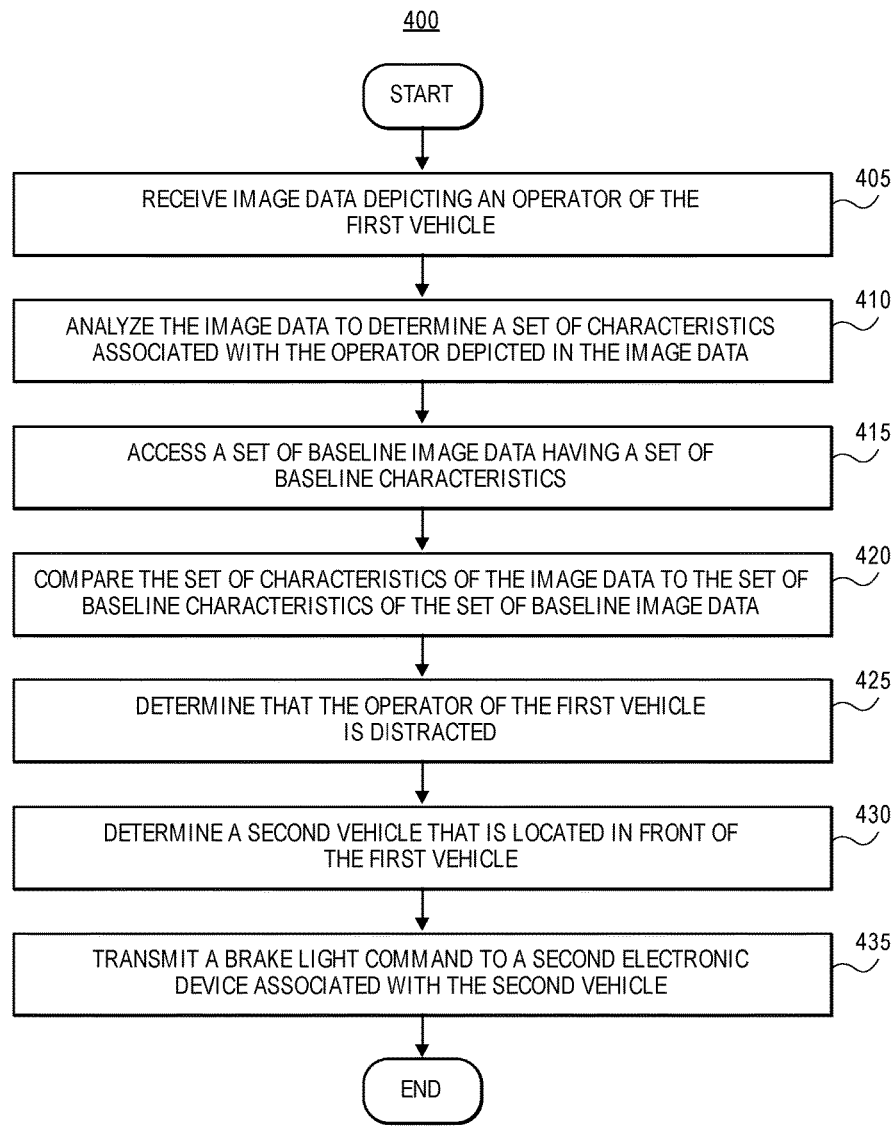
FIG. 4 depicts a block diagram of an exemplary method of analyzing image data to determine the level of distraction.

FIG. 4 depicts a block diagram of an exemplary method 400 of increasing brake light luminosity when a distracted driver is detected. The method 400 may be facilitated by an electronic device such as a server. The server may support execution of a dedicated application that may facilitate the functionalities of the method 400.

The method 400 may begin when the server receives (block 405) image data from at least one image sensor located within a first vehicle being operated by an operator. In embodiments, the image sensor may be a component of an electronic device or may be external to the electronic device. Further, the server may receive the image data in real-time or near real-time as the at least one image sensor captures the image data.

After receiving the image data from the at least one image sensor, the server may analyze (block 410) the image data to determine a set of characteristics associated with the operator of the first vehicle. In embodiments, the server may determine at least one of: a position of the operator of the first vehicle as depicted in the image data, and a movement made by the operator of the first vehicle as depicted in the image data, where the position and/or the movement may be indicative of the state of the operator of the first vehicle. It should be appreciated that various techniques for analyzing the image data are envisioned.

The server may access (block 415) a set of baseline image data. The set of baseline image data may consist of multiple images depicting various states of a baseline or generic operator. Each state may be classified with a level of distraction. In one implementation, the server may perform a facial recognition analysis using the image data and the baseline image data. It should be appreciated that alternate or additional analyses, techniques, calculations, algorithms, or the like are envisioned. In some embodiments, the server may not have enough relevant data to identify the vehicle operator, in which case processing may return to block 405 at which additional image data may be received, or processing may end or proceed to other functionality.

The server may further compare (420) the set of characteristics of the image data to the set of baseline characteristics of the set of baseline image data. In some embodiments, the server may analyze the baseline image data to determine a set of characteristics associated with an operator depicted in the captured image data. The server may then select an image from the baseline image data that is most similar to the captured image of the operator. Further, the server may determine how close the captured image data matches the baseline image data and assign a similarity percentage to the captured image data indicating the closeness of the match. Based on the classification and similarity percentage being above a threshold, the server may determine (block 425) that the operator of the first vehicle is distracted. For example, the operator of the first vehicle may be reading a text on his phone.

The electronic device may also access a set of telematics data associated with operation of the vehicle as well as a set of additional vehicles. In particular, the electronic device may consider at least one of: a location of the first vehicle, a location of one or more additional vehicles in a vicinity of the first vehicle, and a future movement and/or location of the first vehicle.

The server may determine or identify (block 430) a second vehicle that is located in front of the first vehicle. In one embodiment, the server may determine the location and positioning of the first and second vehicles based on the, location, speed and/or direction of travel of the first and second vehicles.

After determining that the second vehicle is located in front of the first vehicle, the server may generate and transmit (block 435) a brake light command to a second electronic device associated with the second vehicle, where execution of the brake light command may cause brake lights of the second vehicle to modify or change. In an implementation, the second electronic device may send a command to a brake light interface of the second vehicle. In one embodiment, the brake light interface may be directly connected to the brakes of the second vehicle. In another embodiment, the brake light interface may send a command indirectly either directly to the brake lights or indirectly to the brake lights via an on board device (OBD) system. Upon receiving the command, the brake light interface may send a command to increase the luminosity of the brake lights of the second vehicle. In another embodiment, an additional brake light command may be transmitted to the brake light interface of the second vehicle that may cause the brake lights of the second vehicle to modify their intensity. In other embodiments, the second electronic device may display an alert that may be viewable by an operator of the second vehicle, where the alert may identify the first vehicle.

In other embodiments, the server may determine that the second vehicle is no longer directly in front of the first vehicle. In this situation, the server may transmit a command to the electronic device of the second vehicle that, upon execution, may cause the brake lights of the second vehicle to revert to normal intensity. In addition, the server may determine that the operator of the first vehicle remains distracted. In this situation, the server may transmit a command to the electronic device of the second vehicle that, upon execution, may cause the brake lights of the second vehicle to blink at variable rates, or create other effects.

Figure 5:
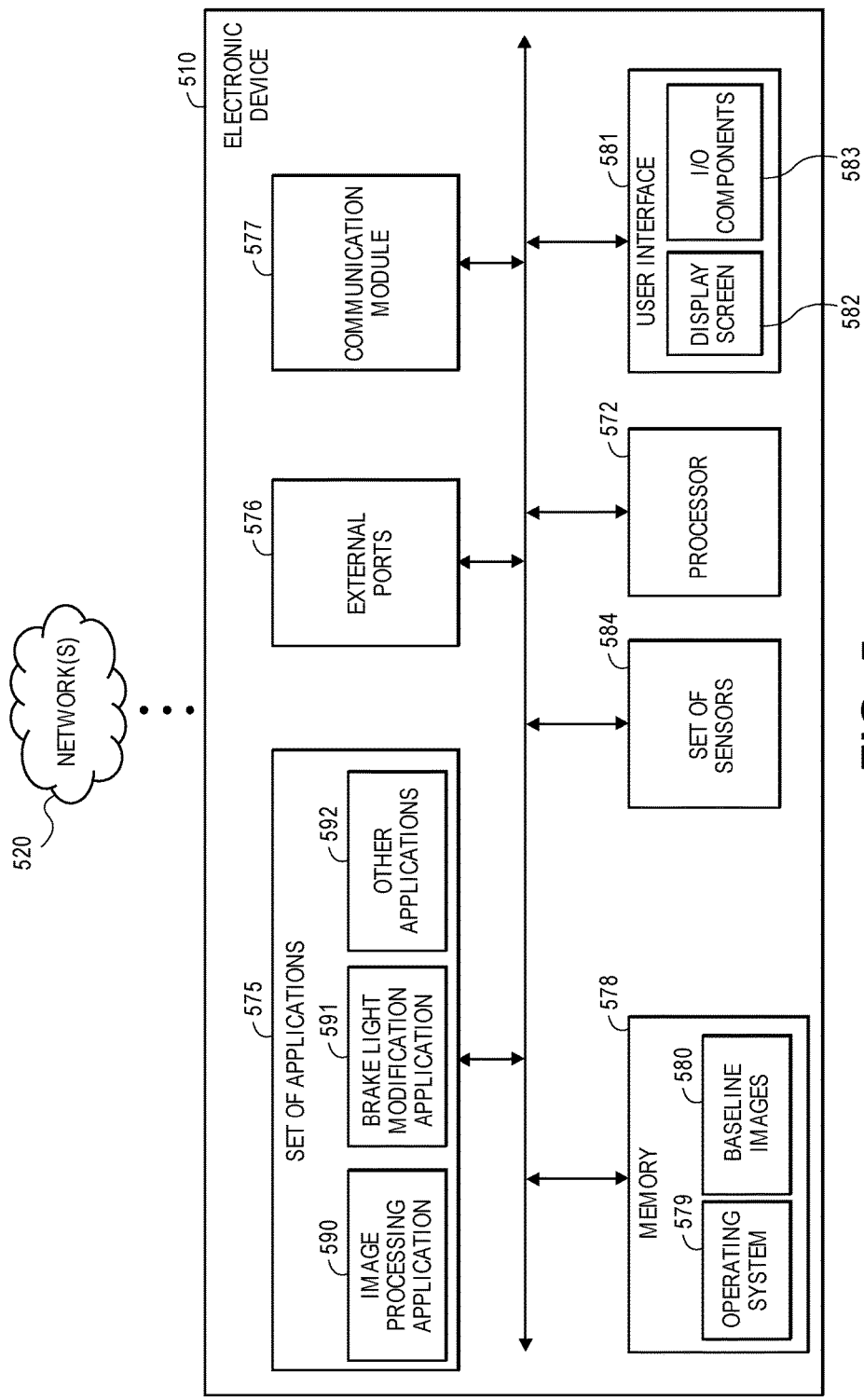
FIG. 5 illustrates a diagram of an exemplary mobile or the electronic device.

FIG. 5 illustrates a diagram of an exemplary mobile or other electronic device 510 (such as one of the electronic devices 110, 115 as discussed with respect to FIG. 1) in which the functionalities as discussed herein may be implemented. It should be appreciated that the electronic device 510 may be configured to be transported in a vehicle and/or connect to an on-board telematics platform of the vehicle, as discussed herein. Further, it should be appreciated that the electronic device 510 may be integrated into an on-board system of the vehicle. In an implementation, the electronic device 510 may be a back-end device such as a server.

The electronic device 510 may include a processor 522 as well as a memory 578. The memory 578 may store an operating system 579 capable of facilitating the functionalities as discussed herein as well as a set of applications 575 (i.e., machine readable instructions). For example, one of the set of applications 575 may be an image processing application 590 configured to analyze image data to determine the level of distraction of a vehicle operator, and a brake light modification application 591 configured to generate brake light commands. It should be appreciated that one or more other applications 592 are envisioned.

The processor 522 may interface with the memory 578 to execute the operating system 579 and the set of applications 575. According to some embodiments, the memory 578 may also include baseline images 580 that may include data associated with a set of individuals associated with a set of vehicles. In some implementations, the image processing application 590 may interface with the baseline images 580 to retrieve appropriate profile data and compare the profile data to received image data. The memory 578 may include one or more forms of volatile and/or non-volatile, fixed and/or removable memory, such as read-only memory (ROM), electronic programmable read-only memory (EPROM), random access memory (RAM), erasable electronic programmable read-only memory (EEPROM), and/or other hard drives, flash memory, MicroSD cards, and others.

The electronic device 510 may further include a communication module 577 configured to communicate data via one or more networks 520. According to some embodiments, the communication module 577 may include one or more transceivers (e.g., WWAN, WLAN, and/or WPAN transceivers) functioning in accordance with IEEE standards, 3GPP standards, or other standards, and configured to receive and transmit data via one or more external ports 576. Further, the communication module 577 may include a short-range network component (e.g., an RFID reader) configured for short-range network communications. For example, the communication module 577 may receive, via the network 520, image data from a set of image sensors. For further example, the communication module 577 may transmit data to and receive data from a remote server via the network 520.

The electronic device 510 may further include a set of sensors 584. The processor 522 and the set of applications 575 may interface with the set of sensors 584 to retrieve and process the corresponding sensor data. The set of sensors 584 may include, for example, a location module, an accelerometer, a gyroscope, a compass, a weather sensors, one or more image sensors, various biometric sensors capable of sensing various biometric data as discussed herein, and/or the like. In one particular implementation, the image processing application 590 may analyze image data captured by one or more of the image sensors.

The electronic device 510 may further include a user interface 581 configured to present information to a user and/or receive inputs from the user. As shown in FIG. 5, the user interface 581 may include a display screen 582 and I/O components 583 (e.g., ports, capacitive or resistive touch sensitive input panels, keys, buttons, lights, LEDs, speakers, microphones). According to some embodiments, the user may access the electronic device 510 via the user interface 581 to review information and/or perform other functions. In some embodiments, the electronic device 510 may perform the functionalities as discussed herein as part of a "cloud" network or may otherwise communicate with other hardware or software components within the cloud to send, retrieve, or otherwise analyze data.

In general, a computer program product in accordance with an embodiment may include a computer usable storage medium (e.g., standard random access memory (RAM), an optical disc, a universal serial bus (USB) drive, or the like) having computer-readable program code embodied therein, wherein the computer-readable program code may be adapted to be executed by the processor 522 (e.g., working in connection with the operating system 579) to facilitate the functions as described herein. In this regard, the program code may be implemented in any desired language, and may be implemented as machine code, assembly code, byte code, interpretable source code or the like (e.g., via C, C++, Java, Actionscript, Objective-C, Javascript, CSS, XML). In some embodiments, the computer program product may be part of a cloud network of resources.

Although the following text sets forth a detailed description of numerous different embodiments, it should be understood that the legal scope of the invention may be defined by the words of the claims set forth at the end of this patent. The detailed description is to be construed as exemplary only and does not describe every possible embodiment, as describing every possible embodiment would be impractical, if not impossible. One could implement numerous alternate embodiments, using either current technology or technology developed after the filing date of this patent, which would still fall within the scope of the claims.

Throughout this specification, plural instances may implement components, operations, or structures described as a single instance. Although individual operations of one or more methods are illustrated and described as separate operations, one or more of the individual operations may be performed concurrently, and nothing requires that the operations be performed in the order illustrated. Structures and functionality presented as separate components in example configurations may be implemented as a combined structure or component. Similarly, structures and functionality presented as a single component may be implemented as separate components. These and other variations, modifications, additions, and improvements fall within the scope of the subject matter herein.

Additionally, certain embodiments are described herein as including logic or a number of routines, subroutines, applications, or instructions. These may constitute either software (e.g., code embodied on a non-transitory, machine-readable medium) or hardware. In hardware, the routines, etc., are tangible units capable of performing certain operations and may be configured or arranged in a certain manner. In example embodiments, one or more computer systems (e.g., a standalone, client or server computer system) or one or more hardware modules of a computer system (e.g., a processor or a group of processors) may be configured by software (e.g., an application or application portion) as a hardware module that operates to perform certain operations as described herein.

In various embodiments, a hardware module may be implemented mechanically or electronically. For example, a hardware module may comprise dedicated circuitry or logic that may be permanently configured (e.g., as a specialpurpose processor, such as a field programmable gate array (FPGA) or an application-specific integrated circuit (ASIC)) to perform certain operations. A hardware module may also comprise programmable logic or circuitry (e.g., as encompassed within a general-purpose processor or other programmable processor) that may be temporarily configured by software to perform certain operations. It will be appreciated that the decision to implement a hardware module mechanically, in dedicated and permanently configured circuitry, or in temporarily configured circuitry (e.g., configured by software) may be driven by cost and time considerations.

Accordingly, the term "hardware module" should be understood to encompass a tangible entity, be that an entity that is physically constructed, permanently configured (e.g., hardwired), or temporarily configured (e.g., programmed) to operate in a certain manner or to perform certain operations described herein. Considering embodiments in which hardware modules are temporarily configured (e.g., programmed), each of the hardware modules need not be configured or instantiated at any one instance in time. For example, where the hardware modules comprise a general-purpose processor configured using software, the general-purpose processor may be configured as respective different hardware modules at different times. Software may accordingly configure a processor, for example, to constitute a particular hardware module at one instance of time and to constitute a different hardware module at a different instance of time.

Hardware modules may provide information to, and receive information from, other hardware modules. Accordingly, the described hardware modules may be regarded as being communicatively coupled. Where multiple of such hardware modules exist contemporaneously, communications may be achieved through signal transmission (e.g., over appropriate circuits and buses) that connect the hardware modules. In embodiments in which multiple hardware modules are configured or instantiated at different times, communications between such hardware modules may be achieved, for example, through the storage and retrieval of information in memory structures to which the multiple hardware modules have access. For example, one hardware module may perform an operation and store the output of that operation in a memory device to which it may be communicatively coupled. A further hardware module may then, at a later time, access the memory device to retrieve and process the stored output. Hardware modules may also initiate communications with input or output devices, and may operate on a resource (e.g., a collection of information).

The various operations of example methods described herein may be performed, at least partially, by one or more processors that are temporarily configured (e.g., by software) or permanently configured to perform the relevant operations. Whether temporarily or permanently configured, such processors may constitute processor-implemented modules that operate to perform one or more operations or functions. The modules referred to herein may, in some example embodiments, comprise processor-implemented modules.

Similarly, the methods or routines described herein may be at least partially processor-implemented. For example, at least some of the operations of a method may be performed by one or more processors or processor-implemented hardware modules. The performance of certain of the operations may be distributed among the one or more processors, not only residing within a single machine, but deployed across a number of machines. In some example embodiments, the processor or processors may be located in a single location (e.g., within a home environment, an office environment, or as a server farm), while in other embodiments the processors may be distributed across a number of locations.

The performance of certain of the operations may be distributed among the one or more processors, not only residing within a single machine, but deployed across a number of machines. In some example embodiments, the one or more processors or processor-implemented modules may be located in a single geographic location (e.g., within a home environment, an office environment, or a server farm). In other example embodiments, the one or more processors or processor-implemented modules may be distributed across a number of geographic locations.

Unless specifically stated otherwise, discussions herein using words such as "processing," "computing," "calculating," "determining," "presenting," "displaying," or the like may refer to actions or processes of a machine (e.g., a computer) that manipulates or transforms data represented as physical (e.g., electronic, magnetic, or optical) quantities within one or more memories (e.g., volatile memory, non-volatile memory, or a combination thereof), registers, or other machine components that receive, store, transmit, or display information.

As used herein any reference to "one embodiment" or "an embodiment" means that a particular element, feature, structure, or characteristic described in connection with the embodiment may be included in at least one embodiment. The appearances of the phrase "in one embodiment" in various places in the specification are not necessarily all referring to the same embodiment.

The terms "insurer," "insuring party," and "insurance provider" are used interchangeably herein to generally refer to a party or entity (e.g., a business or other organizational entity) that provides insurance products, e.g., by offering and issuing insurance policies. Typically, but not necessarily, an insurance provider may be an insurance company.

As used herein, the terms "comprises," "comprising," "may include," "including," "has," "having" or any other variation thereof, are intended to cover a non-exclusive inclusion. For example, a process, method, article, or apparatus that comprises a list of elements is not necessarily limited to only those elements but may include other elements not expressly listed or inherent to such process, method, article, or apparatus. Further, unless expressly stated to the contrary, "or" refers to an inclusive or and not to an exclusive or. For example, a condition A or B is satisfied by any one of the following: A is true (or present) and B is false (or not present), A is false (or not present) and B is true (or present), and both A and B are true (or present).

In addition, use of the "a" or "an" are employed to describe elements and components of the embodiments herein. This is done merely for convenience and to give a general sense of the description. This description, and the claims that follow, should be read to include one or at least one and the singular also may include the plural unless it is obvious that it is meant otherwise.

This detailed description is to be construed as examples and does not describe every possible embodiment, as describing every possible embodiment would be impractical, if not impossible. One could implement numerous alternate embodiments, using either current technology or technology developed after the filing date of this application.

What is claimed is:

1. A computer-implemented method of dynamically modifying a brake lights of a first vehicle, the method comprising:

receiving, from a first electronic device associated with the first vehicle, image data depicting an operator of the first vehicle;

analyzing, by a processor, the image data to determine a set of characteristics associated with the operator depicted in the image data;

accessing a set of baseline image data having a set of baseline characteristics;

comparing the set of characteristics of the image data to the set of baseline characteristics of the set of baseline image data;

based on the comparing, determining that the operator of the first vehicle is distracted;

determining, based on a location of the first vehicle, a second vehicle that is located in front of the first vehicle;

transmitting, via a communication network, a brake light command to a second electronic device associated with the second vehicle, wherein the second electronic device is configured to execute the brake light command to cause brake lights of the second vehicle to modify intensity.

2. The computer-implemented method of claim 1, wherein determining, based on the location of the first vehicle, the second vehicle that is located in front of the first vehicle comprises:

determining at least one of: a location of the second vehicle, a speed of the second vehicle, and a direction of travel of the second vehicle; and determining, based on the location of the first vehicle and the at least one of: the location of the second vehicle, the speed of the second vehicle, and the direction of travel of the second vehicle, that the second vehicle is located in front of the first vehicle.

3. The computer-implement method of claim 1, further comprising:

determining that an additional vehicle is traveling in front of the first vehicle; and transmitting, via the communication network, an additional brake light command to an additional electronic device associated with the additional vehicle, wherein the additional electronic device is configured to execute the additional brake light command to cause brake lights of the additional vehicle to modify intensity.

4. The computer-implemented method of claim 1, wherein transmitting the brake light command to the second electronic device comprises:

transmitting, via the communication network, the brake light command to a brake light interface associated with the second vehicle, wherein the brake light interface is connected to the brake lights of the second vehicle.

5. The computer-implemented method of claim 4, wherein the brake light interface sends the brake light command either directly to the brake lights or indirectly to the brake lights via an on board device (OBD) system.

6. The computer-implemented method of claim 1, further comprising:

determining that the operator of the first vehicle remains distracted; and transmitting, via the communication network, an additional brake light command to the second electronic device associated with the second vehicle, wherein the second electronic device is configured to execute the additional brake light command to cause the brake lights of the second vehicle to blink at a variable rate.

7. The computer-implemented method of claim 1, further comprising:

determining that the second vehicle is no longer located in front of the first vehicle; and transmitting, via the communication network, an additional brake light command to the second electronic device associated with the second vehicle, wherein the second electronic device is configured to execute the additional brake light command to cause the brake lights of the second vehicle to revert to normal intensity.

8. The computer-implemented method of claim 1, further comprising:

transmitting, via the communication network, an alert to the second electronic device associated with the second vehicle, wherein the second electronic device is configured to display the alert.

9. The computer-implemented method of claim 8, wherein the alert identifies the first vehicle.

10. The computer-implemented method of claim 1, further comprising:

generating the brake light command.

11. A server configured to dynamically modify brake lights of a first vehicle, comprising;

a transceiver configured to communicate data via at least one network connection;

a memory configured to store non-transitory computer executable instructions and a set of baseline image data having a set of baseline characteristics;

a processor configured to interface with the transceiver and the memory, and configured to execute the non-transitory computer executable instructions to cause the processor to:

receive, via the transceiver from a first electronic device associated with the first vehicle, image data depicting an operator of the first vehicle, analyze the image data to determine a set of characteristics associated with an operator depicted in the image data, access, from the memory, the set of baseline image data having the set of baseline characteristics, compare the set of characteristics of the image data to the set of baseline characteristics of the set of baseline image data, based on the comparing, determine that the operator of the first vehicle is distracted, determine, based on a location of the first vehicle, a second vehicle that is located in front of the first vehicle, and transmit, via the transceiver, a brake light command to a second electronic device associated with the second vehicle, wherein the second electronic device is configured to execute the brake light command to cause brake lights of the second vehicle to modify intensity.

12. The server of claim 11, wherein to determine, based on the location of the first vehicle, the second vehicle that is located in front of the first vehicle, the processor is configured to:

determine at least one of: a location of the second vehicle, a speed of the second vehicle, and a direction of travel of the second vehicle, and determine, based on the location of the first vehicle and the at least one of: the location of the second vehicle, the speed of the second vehicle, and the direction of travel of the second vehicle, that the second vehicle is located in front of the first vehicle.

13. The server of claim 11, wherein the processor is further configured to:
  determine that an additional vehicle is traveling in front of the first vehicle; and
  transmit, via the transceiver, an additional brake light command to an additional electronic device associated with the additional vehicle, wherein the additional electronic device is configured to execute the additional brake light command to cause brake lights of the additional vehicle to modify intensity.

14. The server of claim 11, wherein to transmit the brake light command to the second electronic device, the processor is configured to:
  transmit, via the transceiver, the brake light command to a brake light interface associated with the second vehicle, wherein the brake light interface is connected to the brake lights of the second vehicle.

15. The server of claim 14, wherein the brake light interface sends the brake light command either directly to the brake lights or indirectly to the brake lights via an on board device (OBD) system.

16. The server of claim 11, wherein the processor is further configured to:
  determine that the operator of the first vehicle remains distracted, and
  transmit, via the transceiver, an additional brake light command to the second electronic device associated with the second vehicle, wherein the second electronic device is configured to execute the additional brake light command to cause the brake lights of the second vehicle to blink at a variable rate.

17. The server of claim 11, wherein the processor is further configured to:
  determine that the second vehicle is no longer located in front of the first vehicle, and
  transmit, via the transceiver, an additional brake light command to the second electronic device associated with the second vehicle, wherein the second electronic device is configured to execute the additional brake light command to cause the brake lights of the second vehicle to revert to normal intensity.

18. The server of claim 11, wherein the processor is further configured to:
  transmit, via the transceiver, an alert to the second electronic device associated with the second vehicle, wherein the second electronic device is configured to display the alert.

19. The server of claim 18, wherein the alert identifies the first vehicle.

20. The server of claim 11, wherein the processor is further configured to:
  generate the brake light command.

* * * * *